US011687321B2

(12) United States Patent
Kwak et al.

(10) Patent No.: US 11,687,321 B2
(45) Date of Patent: Jun. 27, 2023

(54) SYSTEM AND METHOD FOR VALUATING PATENT USING MULTIPLE REGRESSION MODEL AND SYSTEM AND METHOD FOR BUILDING PATENT VALUATION MODEL USING MULTIPLE REGRESSION MODEL

(71) Applicant: Korea Invention Promotion Association, Seoul (KR)

(72) Inventors: Jung Ae Kwak, Seoul (KR); Sang Youp Song, Gyeonggi-do (KR); In Jae Park, Seoul (KR)

(73) Assignee: Korea Invention Promotion Association, Seoul (KR)

( * ) Notice: Subject to any disclaimer, the term of this patent is extended or adjusted under 35 U.S.C. 154(b) by 1074 days.

(21) Appl. No.: 16/199,703

(22) Filed: Nov. 26, 2018

(65) Prior Publication Data

US 2019/0163440 A1 May 30, 2019

(30) Foreign Application Priority Data

Nov. 27, 2017 (KR) ........................ 10-2017-0159442

(51) Int. Cl.
*G06Q 50/18* (2012.01)
*G06F 40/216* (2020.01)
(Continued)

(52) U.S. Cl.
CPC .............. *G06F 7/00* (2013.01); *G06F 40/216* (2020.01); *G06Q 30/0278* (2013.01); *G06Q 50/184* (2013.01)

(58) Field of Classification Search
None
See application file for complete search history.

(56) References Cited

U.S. PATENT DOCUMENTS 7,606,757 B1 * 10/2009 Poltorak ................ G06Q 40/06
  705/36 R
7,676,375 B1 * 3/2010 Neifeld ................... G06Q 40/00
  705/310

(Continued)

FOREIGN PATENT DOCUMENTS

EP     1 876 506 A1    1/2008
JP    2016-018336 A    2/2016
(Continued)

OTHER PUBLICATIONS

Pitkethly, Robert. "The valuation of patents: a review of patent valuation methods with consideration of option based methods and the potential for further research." Research Papers in Management Studies—University of Cambridge Judge Institute of Management Studies (1997).*

(Continued)

*Primary Examiner* — Peter Ludwig
*Assistant Examiner* — Donald J Edmonds
(74) *Attorney, Agent, or Firm* — Stinson LLP

(57) ABSTRACT

The method of building a patent valuation model includes acquiring patent information, processing the patent information and separately performing a plurality of multiple regression analyses in which a plurality of key valuation elements preset for a valuation index are dependent variables, calculating a representative value of a plurality of regression coefficients for each independent variable of a plurality of multiple regression models calculated through the plurality of multiple regression analyses, and generating a valuation model for the valuation index by building a valuation model in which the calculated representative values are coefficients for the respective independent variables.

13 Claims, 8 Drawing Sheets

(51) Int. Cl.
*G06Q 30/02* (2023.01)
*G06F 7/00* (2006.01)

(56) References Cited

U.S. PATENT DOCUMENTS

| | | | | |
|---|---|---|---|---|
| 2004/0172355 | A1* | 9/2004 | Pandher | G06Q 40/04 705/37 |
| 2004/0220842 | A1 | 11/2004 | Barney | |
| 2005/0261927 | A1* | 11/2005 | Bilak | G06Q 40/00 705/36 R |
| 2006/0036452 | A1* | 2/2006 | Williams | G06Q 40/06 705/1.1 |
| 2007/0294232 | A1* | 12/2007 | Gibbs | G06Q 10/10 707/999.005 |
| 2010/0057533 | A1 | 3/2010 | Martinez Ruiz et al. | |
| 2011/0161089 | A1* | 6/2011 | Kuan | G06Q 10/06 705/1.1 |
| 2011/0289096 | A1* | 11/2011 | Barney | G06Q 10/10 707/749 |
| 2013/0282599 | A1* | 10/2013 | Kang | G06Q 10/10 705/310 |
| 2014/0143269 | A1* | 5/2014 | Grune | G06F 16/245 707/769 |
| 2014/0156544 | A1* | 6/2014 | Sabattini | G06Q 50/184 705/310 |
| 2014/0258143 | A1* | 9/2014 | Laroche | G06Q 50/184 705/310 |
| 2014/0317000 | A1* | 10/2014 | Lundberg | G06Q 50/184 705/310 |
| 2014/0379590 | A1* | 12/2014 | Germeraad | G06Q 10/0639 705/310 |
| 2015/0088783 | A1* | 3/2015 | Mun | G06Q 40/02 705/36 R |
| 2015/0178847 | A1* | 6/2015 | Tabata | G06Q 50/184 705/36 R |
| 2017/0262900 | A1* | 9/2017 | Ramachandran | G06N 20/00 |

FOREIGN PATENT DOCUMENTS

| | | |
|---|---|---|
| KR | 10-2011-0068278 A | 6/2011 |
| KR | 10-1333074 B1 | 5/2012 |
| KR | 10-2014-0080593 A | 7/2014 |
| KR | 10-1456189 B1 | 7/2014 |
| KR | 10-1658890 B1 | 7/2014 |
| KR | 10-2015-0107233 A | 9/2015 |
| KR | 10-1598076 B1 | 10/2015 |
| KR | 10-1625124 B1 | 5/2016 |
| WO | 2014/092360 A1 | 6/2014 |

OTHER PUBLICATIONS

Extended European Search Report issued for EP 18206767.8 dated Feb. 19, 2019, 8 pages.

* cited by examiner

SYSTEM AND METHOD FOR VALUATING PATENT USING MULTIPLE REGRESSION MODEL AND SYSTEM AND METHOD FOR BUILDING PATENT VALUATION MODEL USING MULTIPLE REGRESSION MODEL

CROSS-REFERENCE TO RELATED APPLICATION

This application claims priority to and the benefit of Korean Patent Application No. 2017-0159442, filed on Nov. 27, 2017, the disclosure of which is incorporated herein by reference in its entirety.

BACKGROUND

Field of the Invention

The present invention relates to a system and method for building a patent valuation model used to calculate a quantified valuation result of a patent and calculating a quantified valuation result of a patent using the patent valuation model, and more particularly, to a system and method for valuating a patent using a multiple regression model and a system and method for building a patent valuation model using a multiple regression model.

Discussion of Related Art

In a strategizing process on intellectual property rights for protecting a company's technology, costs and efforts for registering and maintaining intellectual property rights are heavy burdens on a holder of many intellectual property rights.

For this reason, intellectual property right holders personally grade their intellectual property rights or have their intellectual property rights graded by commercial or non-commercial organizations through patent technology valuation.

Such patent valuation generally includes experts' valuation and automatic valuation. Experts' valuation is a method in which a patent is valuated by an expert of the corresponding technical field. For experts' valuation, expert knowledge of an individual expert may be used, and qualitative valuation is possible. However, the valuation is likely to be seriously affected by the expert's opinion, and much cost and time are required.

To overcome the demerits of experts' valuation, an automatic patent valuation system is under development. In many cases, however, sample patents for designing a valuation model are valuated by experts, or a valuation model is designed on the basis of only some partial elements. Even when a multiple regression model is used, only one regression model is used. Accordingly, the reliability of a valuation result is in doubt in many cases.

A related art of the present invention is disclosed in Unexamined Korean Patent Publication No. 10-2014-0080593 (Jul. 1, 2014).

SUMMARY

The present invention is directed to providing a system and method for building a patent valuation model using a multiple regression model and a system and method for valuating a patent using a multiple regression model, the systems and methods making it possible to build a highly reliable valuation model, which does not only reflect structural characteristics of specifications but also appropriately reflects valuation elements in which relative environments of technically similar patents are taken into consideration, and to valuate a patent.

According to an aspect of the present invention, there is provided a method of valuating a patent using a multiple regression model, the method being implemented in a computer and comprising: acquiring patent information; processing the patent information and separately performing a plurality of multiple regression analyses in which a plurality of key valuation elements preset for a valuation index are dependent variables; calculating a representative value of a plurality of regression coefficients for each independent variable of a plurality of multiple regression models calculated through the plurality of multiple regression analyses, and generating a valuation model for the valuation index by building a valuation model in which the calculated representative values are coefficients for the respective independent variables; obtaining information on an issued patent; and generating a quantified valuation index of the issued patent which is a valuation target using the generated valuation model.

In some embodiments, the method further comprises generating respective valuation models for a plurality of valuation indices, wherein the valuation indices include one or more of a degree of right, a degree of technology, and a degree of utilization.

In some embodiments, the separately performing of the plurality of multiple regression analyses comprises performing the multiple regression analyses, in which preset valuation elements are the independent variables of the multiple regression models, for the respective key valuation elements.

In some embodiments, the key valuation elements belong to the valuation elements, and a key valuation element is used as an independent variable of a multiple regression model for another key valuation element.

In some embodiments, the generating of the valuation model comprises calculating a weighted average or an arithmetic average of the plurality of regression coefficients as the representative value.

In some embodiments, valuation elements whose significance probabilities are a preset reference value or less are used in the multiple regression models In some embodiments, the separately performing of the plurality of multiple regression analyses comprises performing a multicollinearity test among the valuation elements and excluding one or more valuation elements.

According to an aspect of the present invention, there is provided a system for building a patent valuation model using a multiple regression model, the system comprising: at least one processor; and at least one memory, wherein the at least one memory and the at least one processor store and execute instructions for causing the system to perform operations including: extracting valuation elements by processing acquired patent information; separately performing a plurality of multiple regression analyses in which a plurality of key valuation elements preset for a valuation index are dependent variables; calculating a representative value of a plurality of regression coefficients for each independent variable of a plurality of multiple regression models calculated through the plurality of multiple regression analyses; generating a valuation model for the valuation index by building a valuation model in which the calculated representative values are coefficients for the respective independent variables; and calculating a quantified valuation index of a patent which is a valuation target using the generated valuation model.

In some embodiments, the operations further include valuating a patent whose information has been acquired and storing a valuation result in the valuation result database (DB).

In some embodiments, the operations further includes valuating at a preset point in time the patent whose information has been acquired and storing a valuation result in the valuation result DB.

According to an aspect of the present invention, there is provided a method for building a patent valuation model using a multiple regression model, the method being implemented in a computer and including: acquiring patent information; processing the patent information and separately performing a plurality of multiple regression analyses in which a plurality of key valuation elements preset for a valuation index are dependent variables; and calculating a representative value of a plurality of regression coefficients for each independent variable of a plurality of multiple regression models calculated through the plurality of multiple regression analyses, and generating a valuation model for the valuation index by building a valuation model in which the calculated representative values are coefficients for the respective independent variables.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

Corresponding reference characters indicate corresponding parts throughout the drawings.

DETAILED DESCRIPTION

Figure 1:
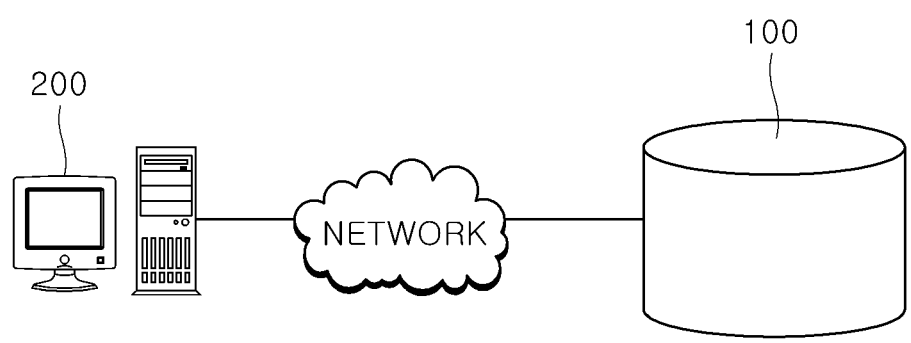
FIG. 1 is an example diagram showing a schematic configuration of a system for valuating a patent using a multiple regression model according to an exemplary embodiment of the present invention.

Hereinafter, a system and method for building a patent valuation model using a multiple regression model and a system and method for valuating a patent using a multiple regression model according to exemplary embodiments of the present invention will be described with reference to the accompanying drawings. In this process, thicknesses of lines, sizes of components, and the like shown in the drawings may be exaggerated for clarity and convenience of description. Further, terms used below are defined in consideration of functionality in the present invention and may vary depending on an intention of a user or an operator or a usual practice. Therefore, definitions thereof should be made on the basis of the overall content of this specification. As used herein, singular forms may include plural forms unless the content clearly indicates otherwise.

FIG. 1 is an example diagram showing a schematic configuration of a system for valuating a patent using a multiple regression model according to an exemplary embodiment of the present invention.

As shown in FIG. 1, the system for valuating a patent using a multiple regression model according to an exemplary embodiment of the present invention may be composed of at least one server 100, which may be connected to a wired or wireless network and provide patent valuation results to a user device 200. In other words, when a valuation service for a specific patent is requested from the user device 200, the server 100 may provide a valuation result of the patent. A detailed operation thereof will be described below.

The server 100 according to an exemplary embodiment of the present invention may include a processor, a memory for storing and executing program data, a permanent storage section, a communication port for communicating with an external device, a user interface device, and the like. Methods implemented by software program modules or algorithms may be stored in computer-readable recording media as computer-readable codes or program instructions which can be executed by the processor. The computer-readable recording media may be distributed to computer systems connected via a network so that computer-readable codes may be stored and executed in a distributed manner.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Figure 2:
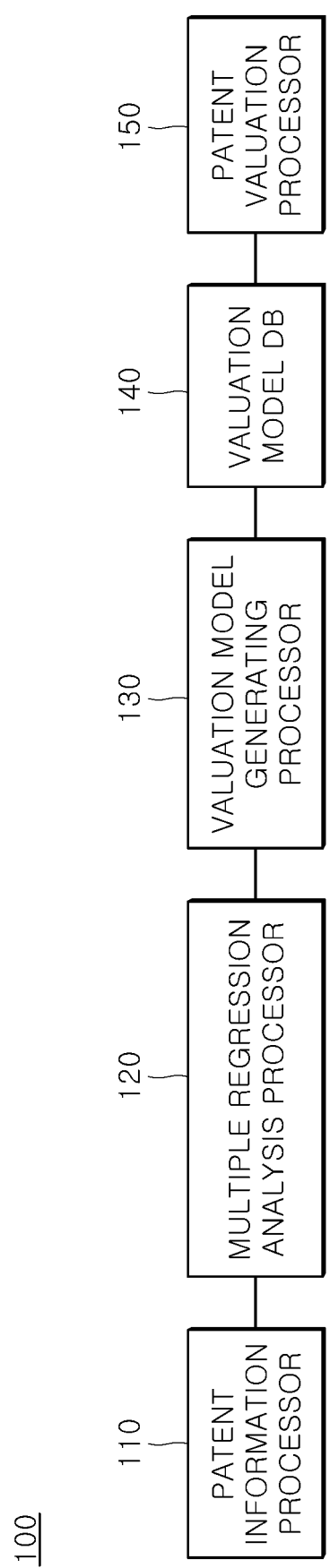
FIG. 2 is an example diagram showing a detailed configuration of a server in a system for valuating a patent using a multiple regression model according to an exemplary embodiment of the present invention.

FIG. 2 is an example diagram showing a detailed configuration of a server in a system for valuating a patent using a multiple regression model according to an exemplary embodiment of the present invention.

As shown in FIG. 2, the server 100 may include a patent information processor 110, a multiple regression analysis processor 120, a valuation model generating processor 130, a valuation model database (DB) 140, and a patent valuation processor 150. According to an exemplary embodiment of the present invention, these components may be distributed to one or more servers connected via a wired or wireless network.

The patent information processor 110 may extract valuation elements by processing acquired patent information.

For example, the patent information processor 110 may collect patent information from an external data provider. Specifically, the server 100 may include a data collector (not shown) which receives Korean or foreign (e.g., US) raw data from the external data provider. Such a data collector may physically include a network interface (a network interface card (NIC)) and may logically be a program serving as an application programming interface (API).

The patent information processor 110 may extract information from the acquired patent information and parse (or convert) the extracted information. For example, the patent information processor 110 may extract information including a patent specification, bibliographic information, progress information, drawings, and the like, and the specification may be written in, for example, extensible markup language (XML). Therefore, it is possible to extract valuation elements by parsing the XML format.

The server 100 may acquire patent information of a plurality of patents, and the patent information processor 110 may extract valuation elements from each patent and store extracted data in a DB (not shown).

Meanwhile, the acquired patent information may have been processed already (e.g., when valuation elements have been extracted and provided in advance). In this case, the patent information processor 110 may omit a process of extracting valuation elements.

The multiple regression analysis processor 120 may build respective multiple regression models, in which a plurality of key valuation elements previously set for a valuation index among the valuation elements are dependent variables, and calculate regression coefficients of the plurality of multiple regression models for respective independent variables by performing multiple regression analyses. A detailed operation thereof will be described below.

The valuation model generating processor 130 may calculate a representative value of regression coefficients of the plurality of multiple regression models calculated for each independent variable by the multiple regression analysis processor 120 and generate a valuation model for the valuation index. For example, a weighted average or an arithmetic average of the regression coefficients may be calculated as the representative value.

The valuation model generating processor 130 may combine regression coefficients of the plurality of multiple regression analysis models for each independent variable into a weight average (or an arithmetic average) and generate (build) a valuation model for the valuation index. Also, the valuation model generating processor 130 may store the generated valuation model in the valuation model DB 140 so that patent valuation may be performed.

The patent valuation processor 150 may calculate a quantified valuation index (e.g., a valuation score or a valuation grade) of a valuation target patent using the valuation model stored in the valuation model DB 140. Specifically, it is possible to calculate a quantified valuation index of the corresponding patent by inputting information of the patent into the respective independent variables of the multiple regression analysis models which have been combined into weight averages (or arithmetic averages), or it is possible to calculate a representative value of valuations on the corresponding patent by combining quantified valuation indices, which will be described below.

Figure 3:
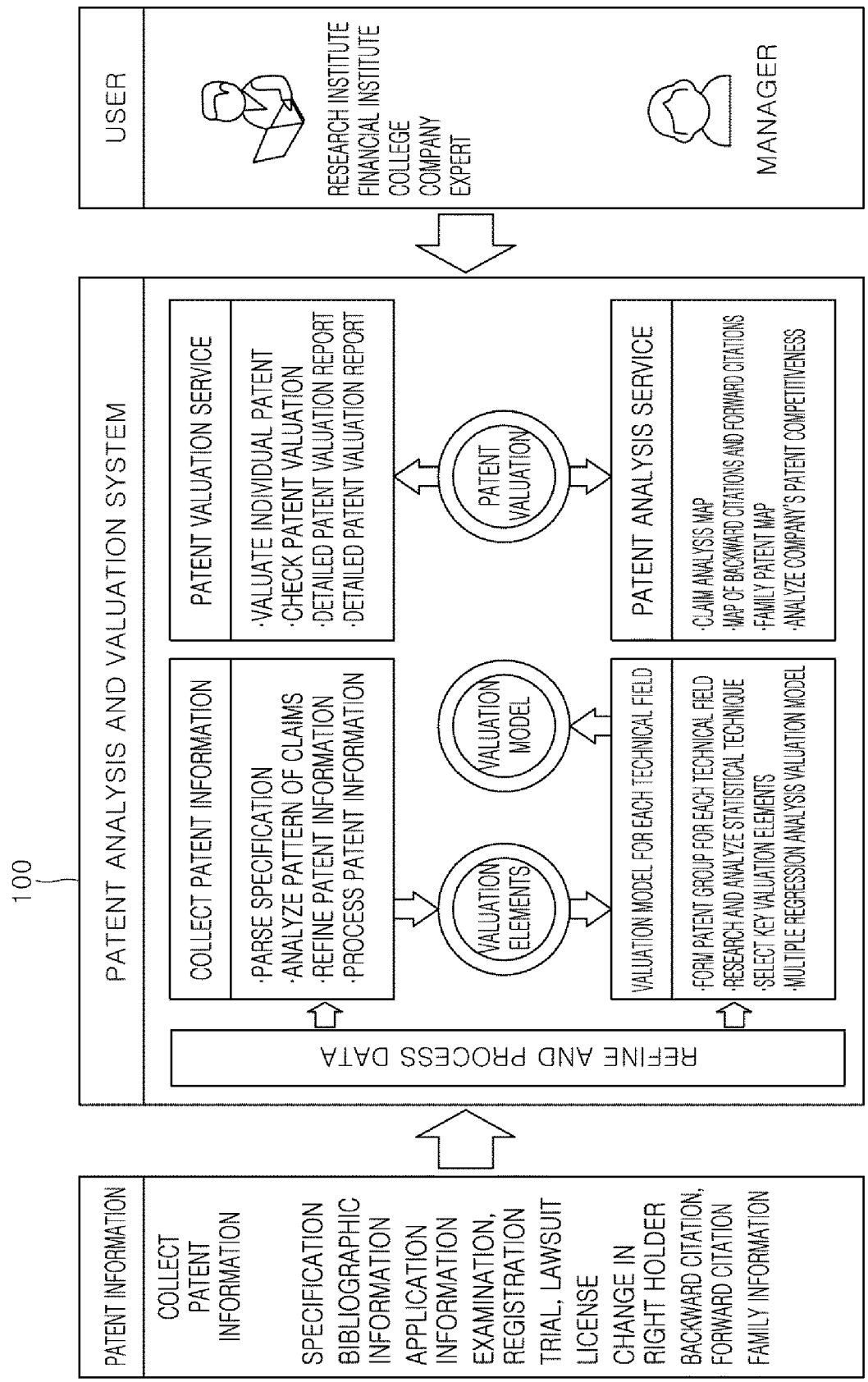
FIG. 3 is an example diagram showing operations of a system for valuating a patent using a multiple regression model according to an exemplary embodiment of the present invention.

FIG. 3 is an example diagram showing operations of a system for valuating a patent using a multiple regression model according to an exemplary embodiment of the present invention.

The server 100 extracts valuation elements by refining and processing collected patent information, generates valuation models for respective valuation indices (or technical fields) through multiple regression analyses, and valuates the patent using the generated valuation models so that a user may be provided with a patent analysis service.

Figure 4:
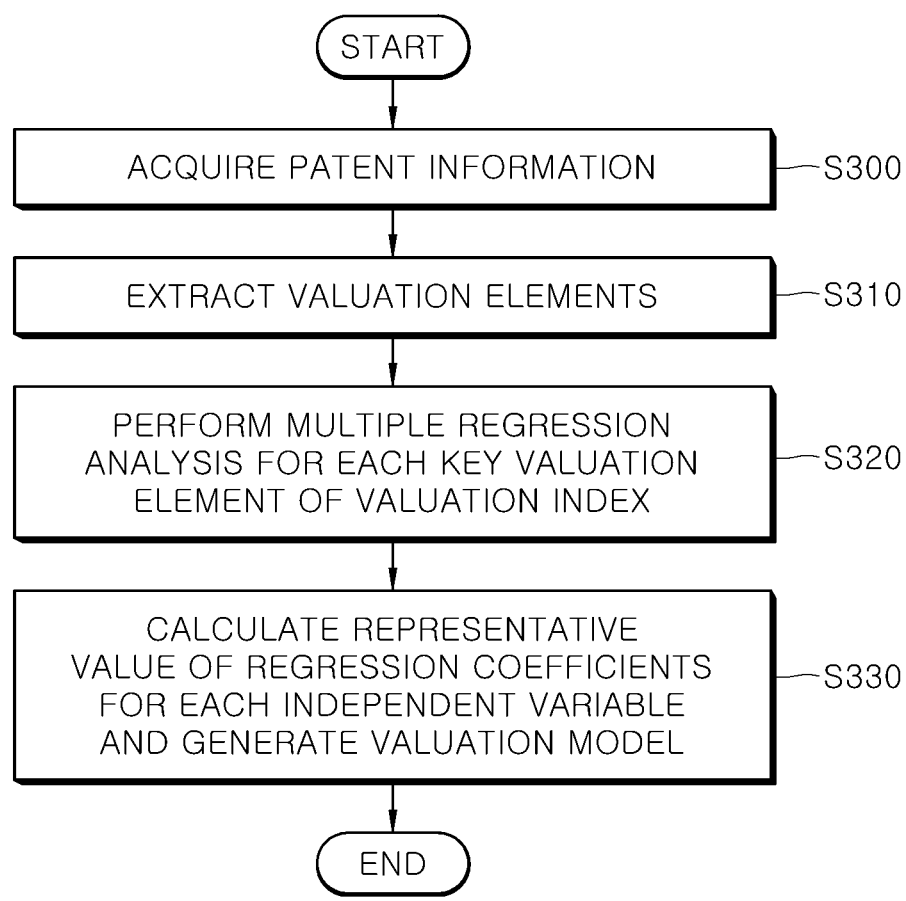
FIG. 4 is a flowchart illustrating a process of generating a valuation model in a method of valuating a patent using a multiple regression model according to an exemplary embodiment of the present invention.
Figure 5:
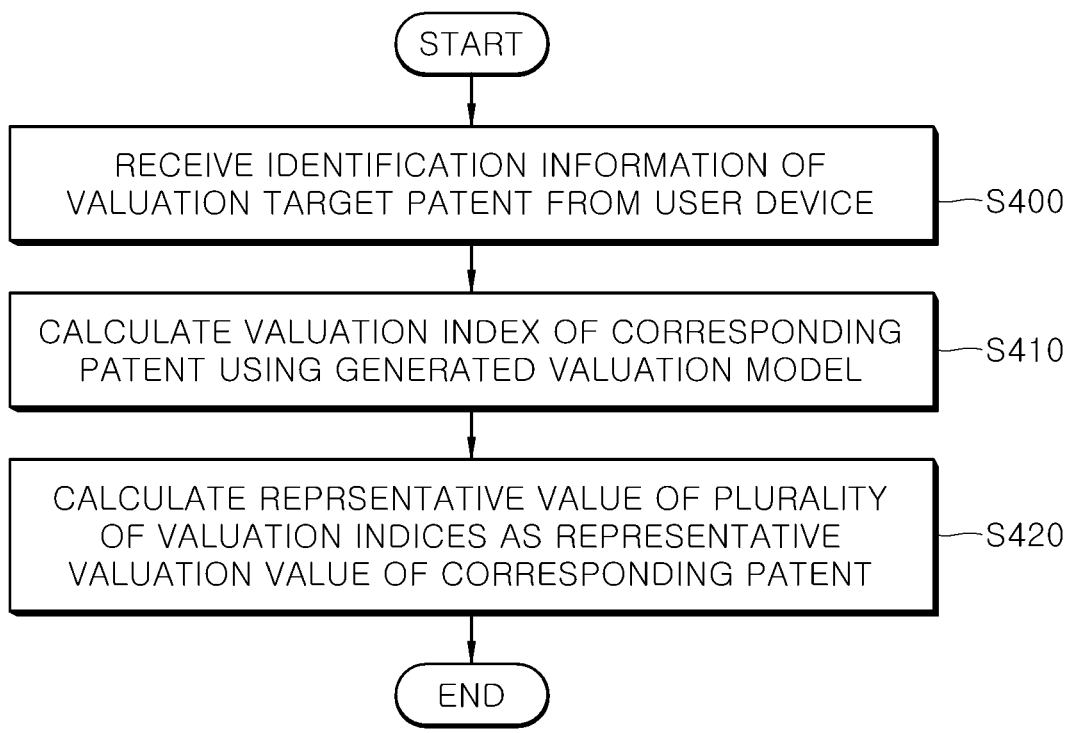
FIG. 5 is a flowchart illustrating a process of valuating a patent in a method of valuating a patent using a multiple regression model according to an exemplary embodiment of the present invention.

FIG. 4 is a flowchart illustrating a process of generating a valuation model in a method of valuating a patent using a multiple regression model according to an exemplary embodiment of the present invention, and FIG. 5 is a flowchart illustrating a process of valuating a patent in a method of valuating a patent using a multiple regression model according to an exemplary embodiment of the present invention. A method of valuating a patent using a multiple regression model according to an exemplary embodiment of the present invention will be described with reference to FIGS. 4 and 5.

As shown in FIG. 4, the server 100 acquires patent information first (S300) and extracts valuation elements from the acquired patent information (S310). When the acquired patent information has been processed already, the operation (S310) of extracting valuation elements may be omitted.

Subsequently, the server 100 performs multiple regression analyses for a plurality of key valuation elements of a valuation index (S320). In other words, the server 100 may build a plurality of multiple regression models, in which each of a plurality of key valuation elements preset for the valuation index is a dependent variable and valuation elements are independent variables, and perform multiple regression analyses for the respective key valuation elements.

Here, the key valuation elements are included in the valuation elements, and multiple regression analyses are performed on the plurality of key valuation elements. For this reason, when multivariate analysis is used, it is not possible to use one key valuation element as an independent variable for another key valuation element. Therefore, in the present invention, general multivariate analysis is not used, but a plurality of multiple regression analysis equations are constructed to perform a multiple regression analysis in which each of a plurality of key valuation elements is a dependent variable.

Specifically, a plurality of multiple regression analysis equations as shown in Equation 1 below may be constructed to perform a regression analysis.

$$y_1 = \beta_0^1 + \beta_1^1 x_1 + \beta_2^1 x_2 + \beta_3^1 x_3 + \ldots + \beta_n^1 x_n + \varepsilon^1$$

$$y_2 = \beta_0^2 + \beta_1^2 x_1 + \beta_2^2 x_2 + \beta_3^2 x_3 + \ldots + \beta_n^2 x_n + \varepsilon^2$$

$$y_3 = \beta_0^3 + \beta_1^3 x_1 + \beta_2^3 x_2 + \beta_3^3 x_3 + \ldots + \beta_n^3 x_n + \varepsilon^3$$

$$\ldots$$

$$y_m = \beta_0^m + \beta_1^m x_1 + \beta_2^m x_2 + \beta_3^m x_3 + \ldots + \beta_n^m x_n + \varepsilon^m$$

Here, y denotes a multiple regression model for a key valuation element, and a subscript thereof denotes an order of a dependent variable (the key valuation element). x denotes independent variables. $\beta_0$ to $\beta_n$ denote regression coefficients, and $\beta_0$ among them denotes a constant. $\varepsilon$ denotes an error. In right terms, superscripts denote orders of dependent variables, and subscripts denote orders of independent variables (valuation elements).

Subsequently, the server 100 calculates a representative value of regression coefficients (including a constant) for each independent variable and generates a valuation model for the valuation index (S330). In other words, since a plurality of multiple regression equations have been constructed for the single valuation index, it is possible to build a final valuation model for the valuation index by combining regression coefficients. For example, a weighted average or an arithmetic average of regression coefficients is calculated as a representative value so that a valuation model may be generated.

Specifically, when regression coefficients are combines into a weighted average, a valuation model may be generated as shown in Equation 2 below.

$$Y=(\alpha_1\beta_0^1+\alpha_2\beta_0^2+\ldots\alpha_m\beta_0^m)+(\alpha_1\beta_1^1+\alpha_2\beta_1^2+\ldots\alpha_m\beta_1^m)+\ldots+(\alpha_1\beta_n^1+\alpha_2\beta_n^2+\ldots\alpha_m\beta_n^m)x_n$$

Here, Y denotes a quantified valuation index, and $\alpha$ denotes a weight and a subscript thereof denotes orders of dependent variables. A calculated representative value becomes a coefficient of an independent variable.

Meanwhile, each multiple regression equation may be constructed to use only valuation elements whose significance probabilities are a reference value or less. Such exclusion of valuation elements may be performed in real time during a multiple regression analysis process. According to an exemplary embodiment of the present invention, the reference value of a significance probability is 0.1 or less and may be 0.05.

Also, valuation elements may be excluded through a multicollinearity test among the valuation elements. In other words, when independent variables have a strong correlation among themselves and mutual exclusion is violated, the corresponding valuation elements may be excluded. In the present embodiment, a valuation element excluded through the multicollinearity test among the valuation elements may be "the number of dependent claims."

Further, valuation elements to be used as independent variables may be set in advance for each key valuation element, and a specific valuation element may be excluded in a manner in which a regression coefficient for a valuation element excluded from a specific key valuation element is fixed at 0 in the corresponding multiple regression equation.

Meanwhile, a method of valuating a patent using a multiple regression model according to the present embodiment may be configured to separately generate valuation models for a plurality of valuation indices. For example, the valuation indices may include one or more of a degree of right, a degree of technology, and a degree of utilization.

Here, the degree of right denotes a degree to which a valuation target patent may maintain an exclusive position in patent disputes with third parties. The degree of technology denotes a degree to which a valuation target patent corresponds with technical trends and leads the technical trends. The degree of utilization denotes a degree to which a valuation target patent is used in business and a utilization probability of the valuation target patent.

In the present embodiment, to appropriately reflect valuation elements in which relative environments of technically similar patents are taken into consideration while reflecting structural characteristics of patent specifications, one or more of the fixed number of invalidation trials or inter partes reviews (IPRs) or post grant reviews (PGRs) proceeding in US Patent Trial and Appeal Board (PTAB), whether a divisional application or a continuation application has been made, and whether the valuation target patent has been involved in a patent infringement action (abbreviated to "infringement action" below) may be used as key valuation elements for the degree of right, one or more of whether a continuation application has been made, the total number of forward citations, and the rates of increase or decrease in patents of respective countries corresponding to a cooperative patent classification (CPC) level of the valuation target patent (e.g., a rate of increase or decrease in US patents in the case of US patent analysis) may be used as key valuation elements for the degree of technology, and one or more of whether a continuation application has been made, whether the valuation target patent has been involved in an infringement action, foreign family information (whether a foreign family application has been made or the number of countries in which a foreign family application has been made), whether the valuation target patent is a standard essential patent, and whether a patent term has been extended may be used as key valuation elements for the degree of utilization. Whether the valuation target patent is a standard essential patent may be used for patents in the fields of electronics, electrics, and information technology (IT), and whether a patent term has been extended may be used for patents in the field of chemistry.

As key valuation elements, valuation elements varying according to characteristics of patent laws and patent systems of individual countries may be taken into consideration. For example, in European patent valuation, one or more of a right limitation procedure, the number of demurrants, whether a divisional application has been made, and the total number of forward citations may be used as key valuation elements for valuating the degree of right, one or more of the total number of forward citations, the number of demurrants, and the number of research papers among cited references may be used as key valuation elements for valuating the degree of technology, and one or more of whether a license has been granted, the number of demurrants, the number of first-entry countries for European patent registration, and a right limitation procedure may be used as key valuation elements for valuating the degree of utilization.

Meanwhile, the method of valuating a patent using a multiple regression model according to the present embodiment may be designed to use, as valuation elements, for example, a rate of increase or decrease in US patents of CPC levels, the number of interferences, the number of international patent classifications (IPCs), the number of IPRs and PGRs (fixed), the number of IPRs and PGRs (pending), the number of requests for continued examinations (RCEs), the number of reexaminations, the number of reissues, whether a continuation application has been made, the number of changes in patentees, the number of drawings included in a patent specification, lengths of independent claims included in the patent specification, the number of independent claims, a length of patent description, the number of inventors, whether a valuation target patent has been involved in an infringement action, the number of times that an annual registration has been made for the patent, whether a preferential examination has been requested, the number of research papers among preceding literatures (referred to as "cited references" below) cited by an examiner, an average age of cited patents (an average of time periods of the cited patents from filing dates to a current point in time), the number of times that information has been provided, whether an expiration date has been extended, an average depth of dependent claims, the number of series of claims, the total number of forward citations, whether the valuation target patent is an standard essential patent, the number of research papers among forward citations, a difference between forward citation and filing dates, foreign family information (the number of countries and whether there is a foreign family), and the like.

During a process of excluding valuation elements according to a significance probability, in the case of a model which has a rate of increase or decrease in US patents of CPC levels as a dependent variable, the fixed number of IPRs and PGRs, the number of interferences, the number of times that information has been provided, etc. may be excluded from valuation elements, and in the case of a model which has the fixed number of IPRs and PGRs as a dependent variable, a rate of increase or decrease in US patents of CPC levels, the number of interferences, whether a continuation application has been made, the number of drawings, a length of patent description, an average age of cited patents, the number of times that information has been provided, an average depth of dependent claims, the number of series of claims, whether the valuation target patent is a standard essential patent, the number of foreign family countries, etc. may be excluded from valuation elements.

Also, in the case of a model in which whether a continuation application has been made is a dependent variable, the fixed number of IPRs and PGRs, the number of RCEs, the number of series of claims, etc. may be excluded from valuation elements. In the case of a model in which whether a valuation target patent has been involved in an infringement action is a dependent variable, an average depth of dependent claims, the number of series of claims, etc. may be excluded from valuation elements. In the case of a model in which the total number of forward citations is a dependent variable, the number of times that information has been provided, etc. may be excluded from valuation elements. In the case of a model in which whether the valuation target patent is a standard essential patent is a dependent variable, the fixed number of IPRs and PGRs, the number of interferences, the number of RCEs, the number of reexaminations, the number of times that information has been provided, the number of research papers among forward citations, etc. may be excluded from valuation elements. In the case of a model in which foreign family information is a dependent variable, the fixed number of IPRs and PGRs, the number of IPRs and PGRs (pending), the number of interferences, the number of times that information has been provided, etc. may be excluded from valuation elements.

Meanwhile, in the method of valuating a patent using a multiple regression model according to the present embodiment, the number of independent claims, lengths of independent claims, an average depth of dependent claims, the number of series of claims, the number of drawings, a length of patent description, whether a divisional application has been made, the number of foreign family countries, the number of IPCs, whether early publication has been made, whether a preferential examination has been requested, the number of submitted opinions, the number of times that information has been provided, the total number of forward citations, a difference between forward citation and filing dates, the number of research papers/foreign patents among preceding literatures, the number of research papers/foreign patents among forward citations, the number of times that an annual registration has been made, the number of inventors, whether an expiration date has been extended, the number of licensees, a change in right holders, the number of pledge rights established by financial institutions, the number of rejections in invalidation trials, the number of withdrawals and dismissals in invalidation trials, the number of appeals against decision of rejection, the number of acceptances in offensive trials to confirm the scope of a patent right, the number of rejections, withdrawals, and dismissals in offensive trials to confirm the scope of a patent right, the number of rejections in defensive trials to confirm the scope of a patent right, the number of acceptances, withdrawals, and dismissals in defensive trials to confirm the scope of a patent right, whether there has been a correction trial, etc. may be used as valuation elements to generate a valuation model for valuating domestic (Korean) patents.

As described above, the method of valuating a patent using a multiple regression model according to the present embodiment may be used to generate a valuation model for valuating patents of individual countries not only including European Union, US, and Korea but also including Japan, China, etc. in the world.

After a valuation model is generated through the above-described process, the server 100 receives identification information of a patent which is a valuation target from the user device 200 as illustrated in FIG. 5 to provide a patent valuation service (S400). For example, the server 100 may receive an application number, a registration number, or the like of the valuation target patent as identification information.

Subsequently, the server 100 calculates a quantified valuation index of the patent using the valuation model generated in operation S330 of FIG. 4 (S410). In other words, the server 100 may acquire valuation elements of the valuation target patent and calculate a corresponding quantified valuation index by putting the acquired valuation elements into the valuation model. At this time, the server 100 may calculate a plurality of quantified valuation indices (e.g., the degree of right, the degree of technology, and the degree of utilization) of the valuation target patent using valuation models for a plurality of valuation indices.

Meanwhile, when a plurality of quantified valuation indices are calculated in operation S410, the server 100 calculates a representative value of the plurality of quantified valuation indices as a representative valuation value of the patent (S420). For example, the server 100 may calculate a representative value (e.g., a weighted average or an arithmetic average) of the calculated degrees of right, technology, and utilization and determine a grade of the patent through the calculated value.

Figure 6:
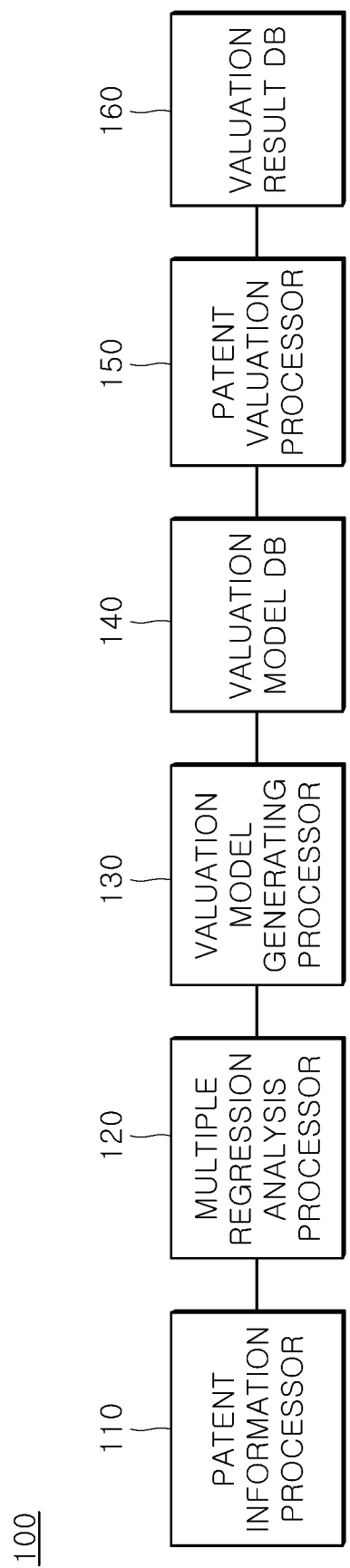
FIG. 6 is an example diagram showing a detailed configuration of a server in a system for valuating a patent using a multiple regression model according to another exemplary embodiment of the present invention.
Figure 7:
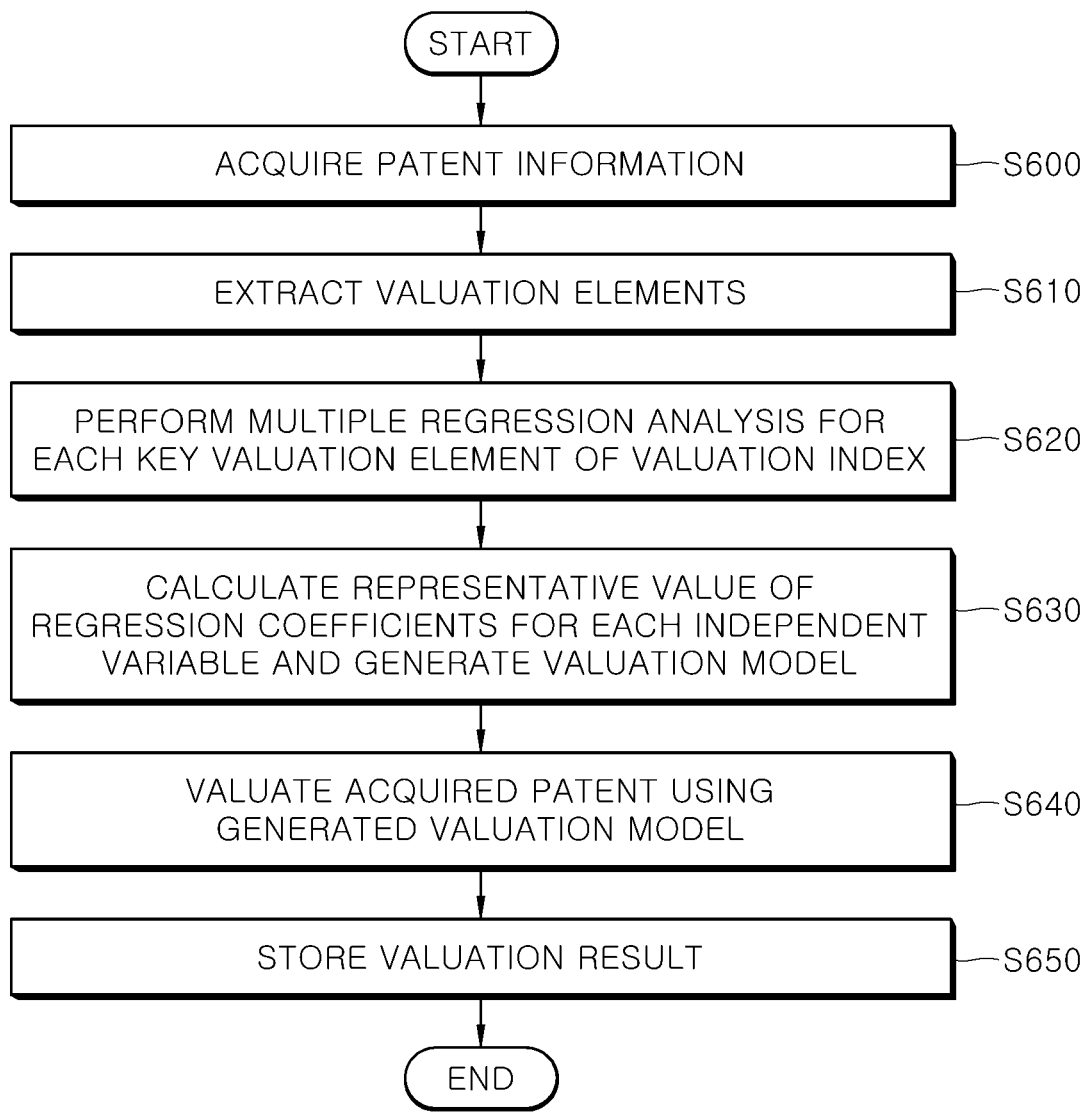
FIG. 7 is a flowchart illustrating a process of valuating a patent in a method of valuating a patent using a multiple regression model according to another exemplary embodiment of the present invention.
Figure 8:
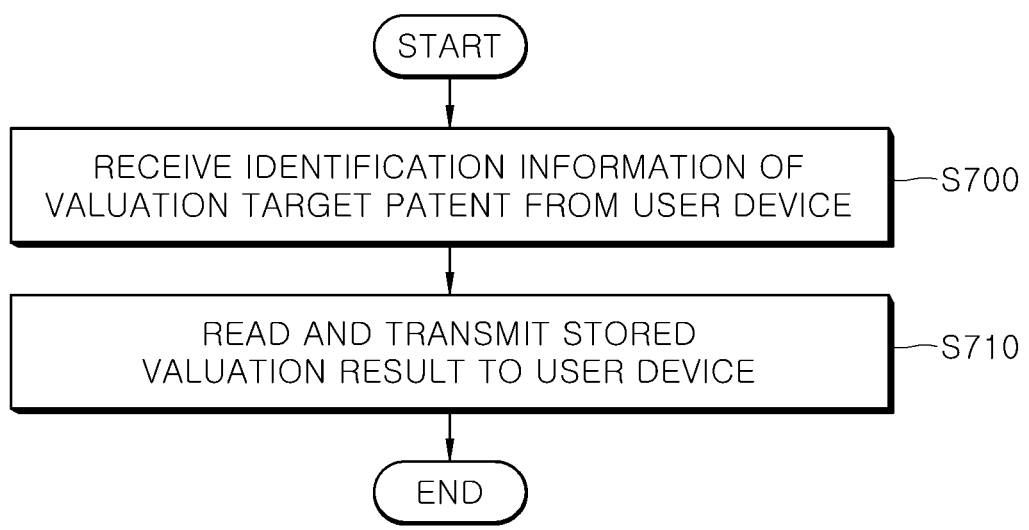
FIG. 8 is a flowchart illustrating a process of providing a patent valuation service in a method of valuating a patent using a multiple regression model according to another exemplary embodiment of the present invention.

FIG. 6 is an example diagram showing a detailed configuration of a server in a system for valuating a patent using a multiple regression model according to another exemplary embodiment of the present invention. FIG. 7 is a flowchart illustrating a process of valuating a patent in a method of valuating a patent using a multiple regression model according to another exemplary embodiment of the present invention, and FIG. 8 is a flowchart illustrating a process of providing a patent valuation service in a method of valuating a patent using a multiple regression model according to another exemplary embodiment of the present invention. The method of valuating a patent using a multiple regression model according to the other exemplary embodiment of the present invention will be described with reference to FIGS. 6 to 8.

As shown in FIG. 6, a server 100 in the system for valuating a patent according to the other exemplary embodiment of the present invention may include a valuation result DB 160 in addition to a patent information processor 110, a multiple regression analysis processor 120, a valuation model generating processor 130, a valuation model DB 140, and a patent valuation processor 150.

Configurations and operations of the patent information processor 110, the multiple regression analysis processor 120, the valuation model generating processor 130, the valuation model DB 140, and the patent valuation processor 150 may be the same as those described with reference to FIG. 2.

The patent valuation processor 150 may perform patent valuation when patent valuation is requested through a user device 200 and may also valuate collected patents automatically and store valuation results in the valuation result DB 160. In this case, when patent valuation is requested through the user device 200, a valuation result previously stored in the valuation result DB 160 is extracted and output so that a time required to output the valuation result in response to the valuation request may be minimized.

According to an exemplary embodiment of the present invention, the patent valuation processor 150 may valuate collected patents again at a preset date and time and update the valuation results stored in the valuation result DB 160. This is because a valuation result of a patent may vary according to valuation time points.

The method of valuating a patent using a multiple regression model according to the other exemplary embodiment of the present invention will be described with reference to FIGS. 7 and 8.

As shown in FIG. 7, operations S600 to S630 may be the same as those described with reference to FIG. 4.

After operation S630, the server 100 valuates a patent acquired in operation S600 using a valuation model generated in operation S630 (S640) and stores a valuation result (S650). In other words, the server 100 may not only build a valuation model using collected patents but may also valuate the collected patents and store valuation results before a user's request.

In this case, as shown in FIG. 8, when identification information of a patent which is a valuation target is received from the user device 200 (S700), the server 100 reads and transmits a stored valuation result to the user device 200 (S710). In other words, during a process of providing a patent valuation service, the patent may not be valuated in real time, and the previously stored patent valuation result may be provided.

A system and method for building a patent valuation model using a multiple regression model and a system and method for valuating a patent using a multiple regression model according to exemplary embodiments of the present invention make it possible to build a multiple regression model for each of a plurality of key valuation elements and generate a valuation model for a patent valuation index by combining a plurality of regression coefficients of the multiple regression models. Therefore, it is possible to appropriately reflect valuation elements in which relative environments of technically similar patents are taken into consideration while reflecting structural characteristics of patent specifications.

In this way, a system and method for building a patent valuation model using a multiple regression model and a system and method for valuating a patent using a multiple regression model according to exemplary embodiments of the present invention make it possible to valuate many patents rapidly and inexpensively on the basis of objective evaluation criteria.

Also, a system and method for building a patent valuation model using a multiple regression model and a system and method for valuating a patent using a multiple regression model according to exemplary embodiments of the present invention make it possible to generate valuation information for each of a plurality of valuation items for one patent.

Although exemplary embodiments of the present invention have been described in detail above, the embodiments are merely illustrative, and those of ordinary skill in the art will appreciate that various modifications and equivalents can be made without departing from the scope of the present invention. Therefore, the scope of the present invention should be determined by the following claims and their equivalents.

What is claimed is:

1. A method of valuating a patent using a multiple regression model, the method being implemented in a computer system comprising a patent information processor, a multiple regression analysis processor, a valuation model generating processor, and a patent valuation processor, the method comprising the steps of:
   acquiring and processing, by the patent information processor, objective evaluation criteria relating to patent information;
   separately performing, by the multiple regression analysis processor, a plurality of multiple regression analyses on the objective evaluation criteria in which a plurality of key valuation elements preset for a valuation index are dependent variables;
   calculating, by the valuation model generating processor, a representative value of a plurality of regression coefficients for each independent variable of a plurality of multiple regression models calculated through the plurality of multiple regression analyses;
   generating, by the valuation model generating processor, a valuation model for the valuation index by building a valuation model in which the calculated representative values are coefficients for the respective independent variables; and
   generating, by the patent valuation processor, a quantified valuation index of an issued patent which is a valuation target using the generated valuation model,
   wherein the separately performing of the plurality of multiple regression analyses comprises performing the multiple regression analyses, in which preset valuation elements are the independent variables of the multiple regression models, for the respective key valuation elements, and
   wherein the key valuation elements belong to the valuation elements, and a key valuation element is used as an independent variable of a multiple regression model for another key valuation element.

2. The method of claim 1, further comprising generating respective valuation models for a plurality of valuation indices,
   wherein the valuation indices include one or more of a degree of right, a degree of technology, and a degree of utilization.

3. The method of claim 1, wherein the generating of the valuation model comprises calculating a weighted average or an arithmetic average of the plurality of regression coefficients as the representative value.

4. The method of claim 1, wherein valuation elements whose significance probabilities are a preset reference value or less are used in the multiple regression models.

5. The method of claim 1, wherein the separately performing of the plurality of multiple regression analyses comprises performing a multicollinearity test among the valuation elements and excluding one or more valuation elements.

6. A system for building a patent valuation model using a multiple regression model, the system comprising:
   a plurality of processors, including a patent information processor, a multiple regression analysis processor, a valuation model generating processor, and a patent valuation processor; and
   at least one memory,
   wherein the at least one memory store instructions that, when executed by the processors, cause the system to perform operations including:
   extracting, by the patent information processor, objective valuation elements by processing acquired patent information;
   separately performing, by the multiple regression analysis processor, a plurality of multiple regression analyses in which a plurality of key valuation elements preset for a valuation index are dependent variables;
   calculating, by the valuation model generating processor, a representative value of a plurality of regression coefficients for each independent variable of a plurality of multiple regression models calculated through the plurality of multiple regression analyses;
   generating, by the valuation model generating processor, a valuation model for the valuation index by building a valuation model in which the calculated representative values are coefficients for the respective independent variables; and
   calculating, by the patent valuation processor, a quantified valuation index of a patent which is a valuation target using the generated valuation model,
   wherein the separately performing of the plurality of multiple regression analyses comprises performing the multiple regression analyses, in which preset valuation elements are the independent variables of the multiple regression models, for the respective key valuation elements, and
   wherein the key valuation elements belong to the valuation elements, and a key valuation element is used as an independent variable of a multiple regression model for another key valuation element.

7. The system of claim 6, the operations further include valuating a patent whose information has been acquired and storing a valuation result in a valuation result database (DB).

8. The system of claim 7, the operations further include valuating at a preset point in time the patent whose information has been acquired and storing a valuation result in the valuation result DB.

9. A method of building a patent valuation model using a multiple regression model, the method being implemented in a computer system comprising a patent information processor, a multiple regression analysis processor, a valuation model generating processor, and a patent valuation processor, the method comprising:
   acquiring and processing, by the patent information processor, objective evaluation criteria relating to patent information;
   separately performing, by the multiple regression analysis processor, a plurality of multiple regression analyses on the objective evaluation criteria in which a plurality of key valuation elements preset for a valuation index are dependent variables;
   calculating, by the valuation model generating processor, a representative value of a plurality of regression coefficients for each independent variable of a plurality of multiple regression models calculated through the plurality of multiple regression analyses; and
   generating, by the valuation model generating processor, a valuation model for the valuation index by building a valuation model in which the calculated representative values are coefficients for the respective independent variables,
   wherein the separately performing of the plurality of multiple regression analyses comprises performing the multiple regression analyses, in which preset valuation elements are the independent variables of the multiple regression models, for the respective key valuation elements, and
   wherein the key valuation elements belong to the valuation elements, and a key valuation element is used as an independent variable of a multiple regression model for another key valuation element.

10. The method of claim 9, wherein the generating of the valuation model comprises calculating a weighted average or an arithmetic average of the plurality of regression coefficients as the representative value.

11. The method of claim 9, wherein valuation elements whose significance probabilities are a preset reference value or less are used in the multiple regression models.

12. The method of claim 9, wherein the separately performing of the plurality of multiple regression analyses comprises performing a multicollinearity test among the valuation elements and excluding one or more valuation elements.

13. The method of claim 9, further comprising generating respective valuation models for a plurality of valuation indices,
   wherein the valuation indices include one or more of a degree of right, a degree of technology, and a degree of utilization.

* * * * *